United States Patent

Andon et al.

[11] 4,082,513
[45] Apr. 4, 1978

[54] INTERMITTENT CATALYST ADDITION SYSTEM

[75] Inventors: Nicholaki A. Andon, Westland; Robert I. Fleece, Detroit, both of Mich.

[73] Assignee: Marathon Oil Company, Findlay, Ohio

[21] Appl. No.: 716,746

[22] Filed: Aug. 23, 1976

Related U.S. Application Data

[62] Division of Ser. No. 543,719, Jan. 14, 1975, Pat. No. 4,018,671.

[51] Int. Cl.² .......................... B01J 8/18; C10G 9/32
[52] U.S. Cl. ............................... 23/288 E; 23/288 S; 214/17 CB; 208/152; 222/70; 302/55
[58] Field of Search ............... 208/152, 164, 176; 23/288 S, 288 B, 288 R, 288 C, 288 E, 253 A; 302/53, 55; 222/70; 214/17 R, 17 CB

[56] References Cited

U.S. PATENT DOCUMENTS

| | | | |
|---|---|---|---|
| 2,536,402 | 1/1951 | Voorhees | 23/288 S |
| 2,695,212 | 11/1954 | Berg | 302/53 X |
| 2,897,009 | 7/1959 | Gianniny, Jr. et al. | 302/53 |
| 3,090,593 | 5/1963 | Pro | 302/55 |
| 3,437,384 | 4/1969 | Bozich | 302/55 X |
| 3,850,582 | 11/1974 | Luckenbach | 208/164 X |

*Primary Examiner*—Morris O. Wolk
*Assistant Examiner*—Roger F. Phillips
*Attorney, Agent, or Firm*—Joseph C. Herring; Jack L. Hummel

[57] ABSTRACT

Catalyst, e.g., for a fluid catalytic cracker, is added automatically by a system consisting of an addition hopper which is periodically fed by gravity from a storage hopper, sealed off from the supply, and then pressurized with air to discharge its contents to the carrier gas line feeding the hydrocarbon conversion unit, e.g., the regenerator section of a Fluid Catalytic Cracking Unit. Sequencing can be by electronic timer-solenoid (or pneumatic) valve system.

1 Claim, 1 Drawing Figure

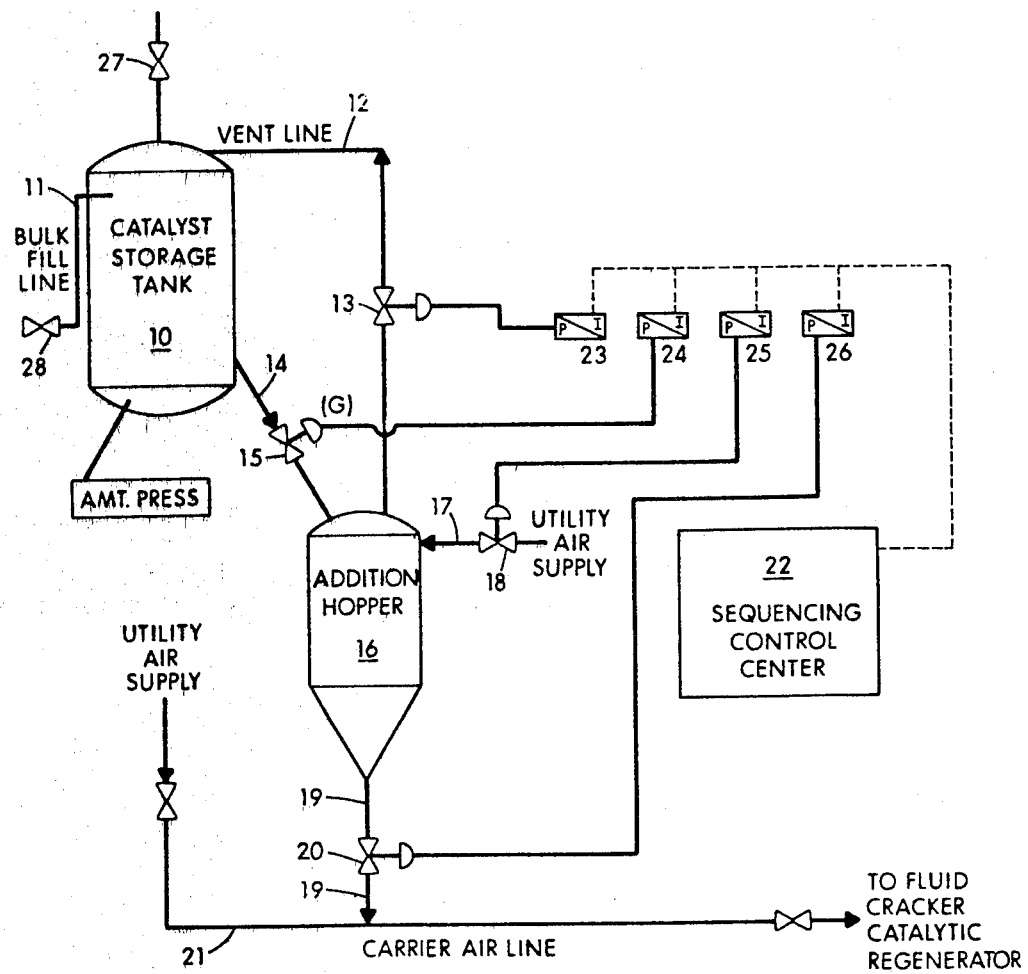

INTERMITTENT CATALYST ADDITION SYSTEM

This is a division of application Ser. No. 543,719, filed Jan. 14, 1975 and now U.S. Pat. No. 4,018,671.

BACKGROUND OF THE INVENTION

1. Field of the Invention

The present invention relates to the field of hydrocarbon conversion and related processes and apparatus.

2. Description of the Prior Art

U.S. Pat. No. 3,479,093 teaches a feeder for fine particles utilizing pressurized feed tanks but which does not relate to fluid catalytic crackers, U.S. Pat. No. 3,437,384 teaches conveying systems for pneumatically conveying solid granular material, U.S. Pat. No. 3,253,866 also relates to pneumatic conveying of granular materials, U.S. Pat. No. 2,572,078 utilizes a rotatable tube communicating with a storage container and having a scoop which forces material into the inside of the tube, e.g., for dispersing iron powder in an oxygen-acetylene stream, and U.S. Pat. No. 2,524,919 entrains powder in a flowing stream of gases.

Various methods of feeding catalyst from storage tanks into airveyor systems have been utilized in the past, including primarily augers and star-wheel arrangements which have sometimes been susceptible to blowback when the wear or malfunction of the star-wheel permitted pressure from the pressurized conveying system to blow back into the low pressure catalyst storage tank.

None of the above prior art permits the invention's complete flexibility of addition while avoiding the use of any moving parts (other than the valves) which are in contact with the flowing catalyst. The present invention also avoids the need for load-cells and other weighing devices which require specialized maintenance procedures.

SUMMARY OF THE INVENTION

General Statement of the Invention

The amount of catalyst fed is regulated by a predetermined volume of the addition hopper wherein each batch is fed to the converter on a predetermined frequency basis. A sequencing control system valves-off flow into the addition hopper, admits gas pressure to the hopper, then opens the lower portion of the hopper permitting flow from the addition hopper into a gas conveyor line which moves the catalyst into the hydrocarbon conversion unit, preferably at the regeneration section.

UTILITY OF THE INVENTION

The present invention is useful with a wide variety of catalytic processes the most popular of which are the hydrocarbon conversion processes, e.g., fluid catalytic cracking, catalytic reforming, etc. By having no moving parts (except valves which move only intermittently) in contact with the abrasive catalyst and by providing a completely closed system for catalyst handling, maintenance and loss of catalyst are sharply reduced. Catalyst activity is more consistently controlled. The amount of catalyst added per unit of time of operation of the catalytic conversion unit is readily varied by merely readjusting one or more clocks in the sequencing controller.

DESCRIPTION OF THE DRAWINGS

The drawing is a schematic representation of the preferred embodiment of the invention.

DESCRIPTION OF THE PREFERRED EMBODIMENTS

Description of the Apparatus

The catalyst storage tank 10 has a bulk fill line 11 fitted with a valve 28 for receiving catalyst from tank trucks or tank cars, a vent line 2 fitted with an automatic valve 13, and a catalyst discharge line 14 fitted with automatic valve 15. The catalyst addition hopper 16 is located so that its lowest point is about ten feet below the bottom of the catalyst storage tank 10 and is connected near its top to the other ends of vent line 12 and catalyst addition line 14. Also near its top, addition hopper 16 is fitted with an air (or other dry gas, e.g., nitrogen, hydrogen, hydrocarbons, or $CO_2$) delivery line 17 controlled by automatic valve 18. The bottom of addition hopper 16 is shaped to permit full discharge of its contents through discharge line 19. Line 19 is controlled by automatic valve 20 and communicates with carrier gas line 21 which conveys the catalyst to the regenerator section of the fluid catalytic cracker. A sequencing control center 22 automatically controls actuating solenoids 23, 24, 25, and 26, which control the air supply to open normally closed valves 13, 15, and 20 respectively, while valve 18 is normally open. The sequencing control center is housed in a moisture tight container meeting the Nema Class rating for hydrocarbon services. Mode switching is such that an automatic, off, or manual position can be readily selected.

The sequencing control center can be any electronic or mechnical timing control device which is capable of activating solenoids 13, 15, 18, and 20, in a predetermined time dependent sequence. Such devices are well known in the art.

DESCRIPTION OF OPERATION

The catalyst storage tank 10, which may be a pressure vessel, is filled via bulk fill line 11 and fill valve 28 is then closed or may be left open as a vent. The addition hopper 16 is vented through line 12 by sequencing control center 22 opening solenoid 23 which in turn opens valve 13 on vent line 12. Gas vented from the addition hopper goes into the catalyst storage tank 10, excess pressure being vented through valve 28 or vent valve 27. Any entrained catalyst is removed from the gas by settling. Sequencing control center 22 opens solenoid 24 which in turn causes instrument air to open valve 15 on the catalyst delivery line 14, permitting catalyst to flow from catalyst storage tank 10 by gravity or gas pressure into addition hopper 16 while pressurizing valve 18 and addition hopper discharge valve 20 remain closed. After a preset time interval which is sufficient to permit addition hopper 16 to fill to a predetermined level at or near its total capacity, sequencing control center 22 closes solenoid 24 causing catalyst addition valve 15 to close. Simultaneously, vent valve 13 is closed and shortly thereafter pressurizing valve 18 is opened to raise the pressure in addition hopper 16 to about 100 pounds per square inch gauge. At a time interval which is adjusted to permit the proper amount of catalyst to be added to the fluid catalytic cracker each day, the sequencing control center 22 opens solenoid 26 which causes instrument air to open control valve 20, emptying the contents of addition hopper 16 into carrier air line 21 which conveys it in a fluidized state to the fluid catalytic cracking unit's regenerator section. Flow from hopper 16 is under the force of the internal pressure of the hopper. After a preset time interval sufficient to permit the hopper to completely empty, the sequencing control center closes solenoid 26, closing catalyst addition valve 20.

Thereafter, vent valve 13 is again opened and the sequence repeats.

The control center sequences the position of valves 13, 15, 18, and 20 during each phase of operation as summarized in Table 1.

Table 1

| Cycle | Valve 13 | Valve 15 | Valve 18 | Valve 20 |
|---|---|---|---|---|
| Fill | Open | Open | Closed | Closed |
| Addition Pressure | Closed | Closed | Open | Closed |
| Empty | Closed | Closed | Open | Open |

MODIFICATIONS OF THE INVENTION

Modifications of the invention which are obvious to those skilled in the art are to be included within the scope of the claims appended hereto.

For example, the invention can be employed to handle a wide variety of bulk solids and the gas used can be air, nitrogen, hydrocarbons, carbon dioxide, etc.

What is claimed is:

1. Apparatus for the addition of catalyst to a fluid catalytic converter comprising in combination:
   (a) a catalyst storage tank capable of operating at pressure greater than atmospheric having a valvable vent means, that permits operation of the storage tank at atmospheric pressure;
   (b) an addition hopper located at a substantially lower elevation than said catalyst storage tank,
   (c) a catalyst carrier air line having air or other gases moving through said line to said catalytic converter;
   (d) a first valvable communication means between a lower portion of said storage tank and said addition hopper;
   (e) a second valvable communication means between said addition hopper and said carrier air line;
   (f) venting means for venting said addition hopper to said catalyst storage tank;
   (g) pressurizing means for increasing the pressure of said addition hopper; and
   (h) sequencing control means to which said first and second valvable communication means, said venting means and said pressurizing means are all responsive, whereby said addition hopper is vented to the pressure within said storage tank, said first valvable communication means between said storage tank and said addition hopper is opened, said second valvable communication means between said carrier air line and said addition hopper being closed so that said addition hopper is filled to a preset level and thereafter said first valvable communication means between said storage tank and said addition hopper and said venting means are closed, said pressurizing means is activated to increase the pressure in said addition hopper to a pressure at least as high as the pressure in said carrier air line and thereafter said second valvable communication means between said addition hopper and said carrier air line is opened to permit flow of catalyst from said addition hopper via said carrier air line to said fluid catalytic converter and to place the apparatus in restored condition by deactivating said pressurizing means and closing said second valvable communication means.

* * * * *